Oct. 1, 1957  L. M. DORMAN  2,807,970
DIE INSERT FOR MOLDING SLIDE FASTENER STRINGERS
AND METHOD OF MAKING THE SAME
Filed Sept. 8, 1951  3 Sheets-Sheet 2
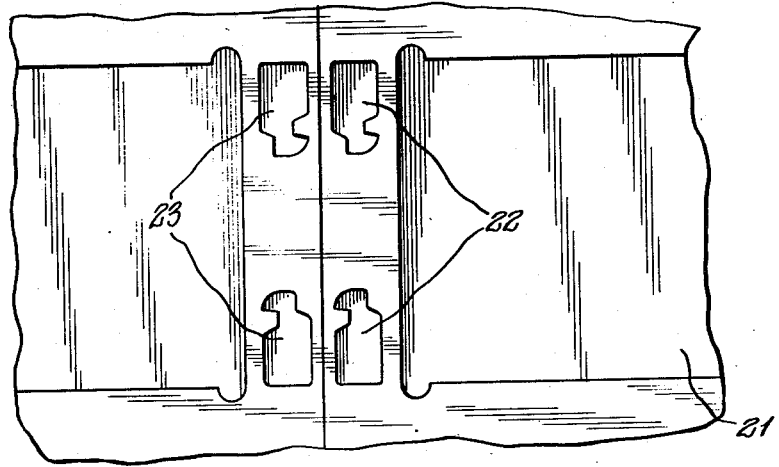
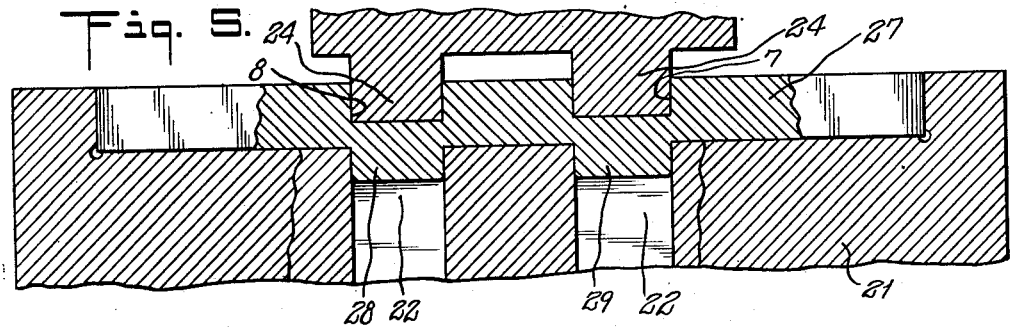
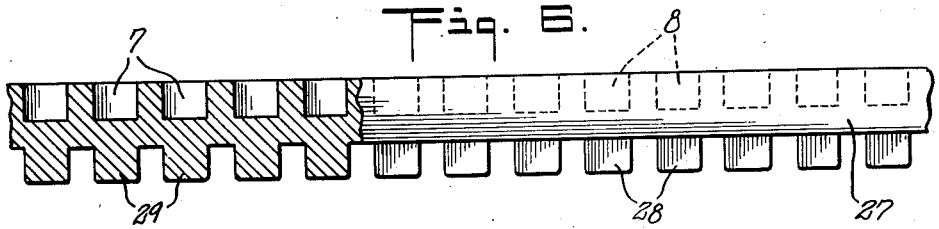
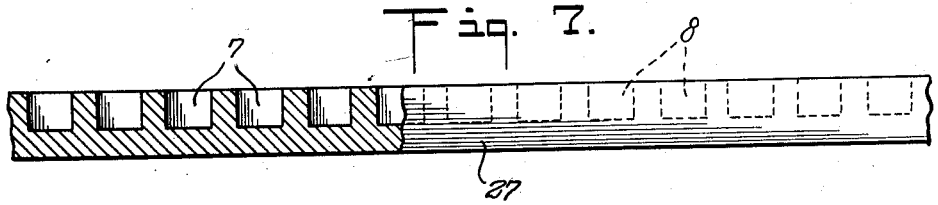
INVENTOR.
LEONARD M. DORMAN
BY
ATTORNEY

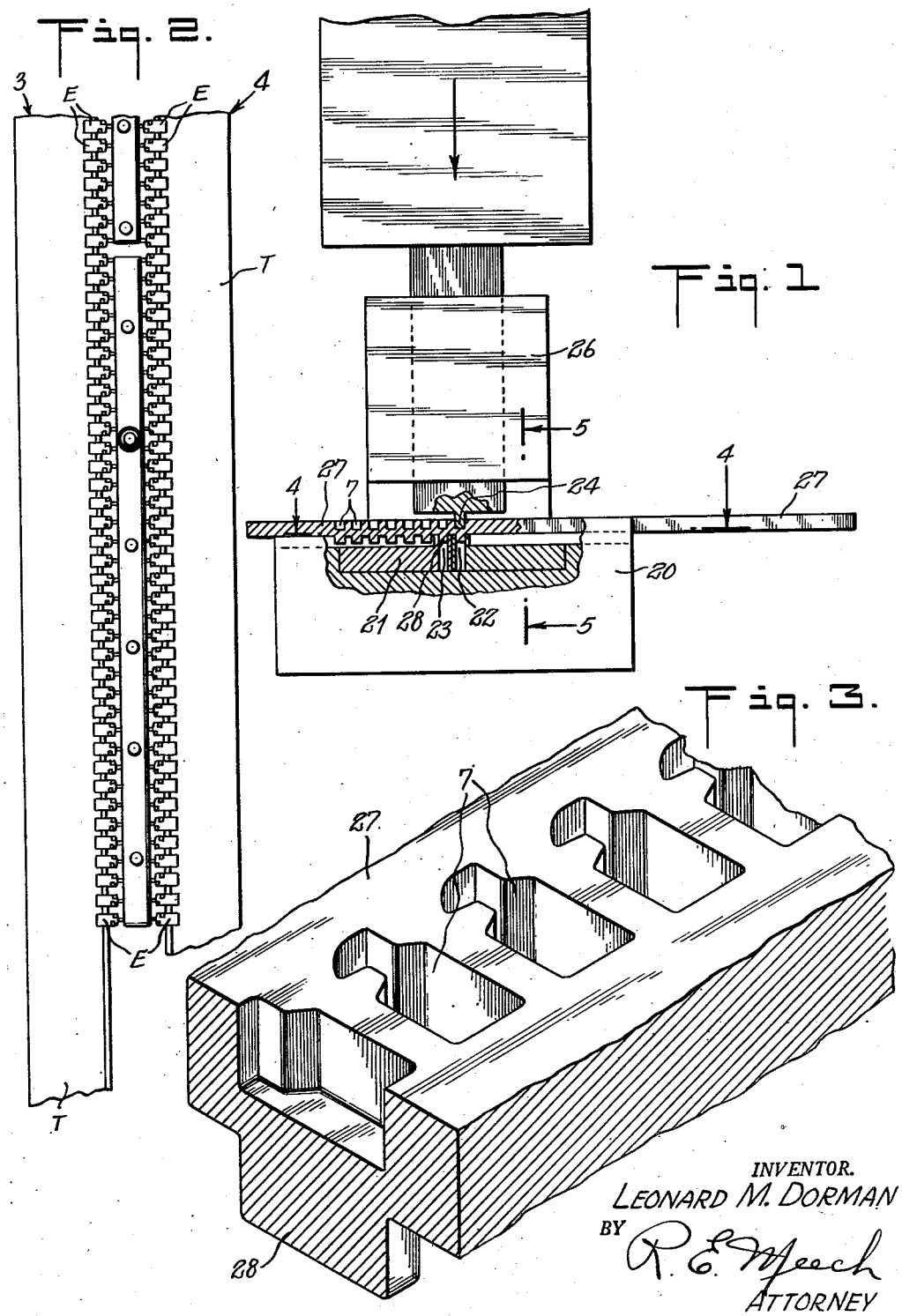

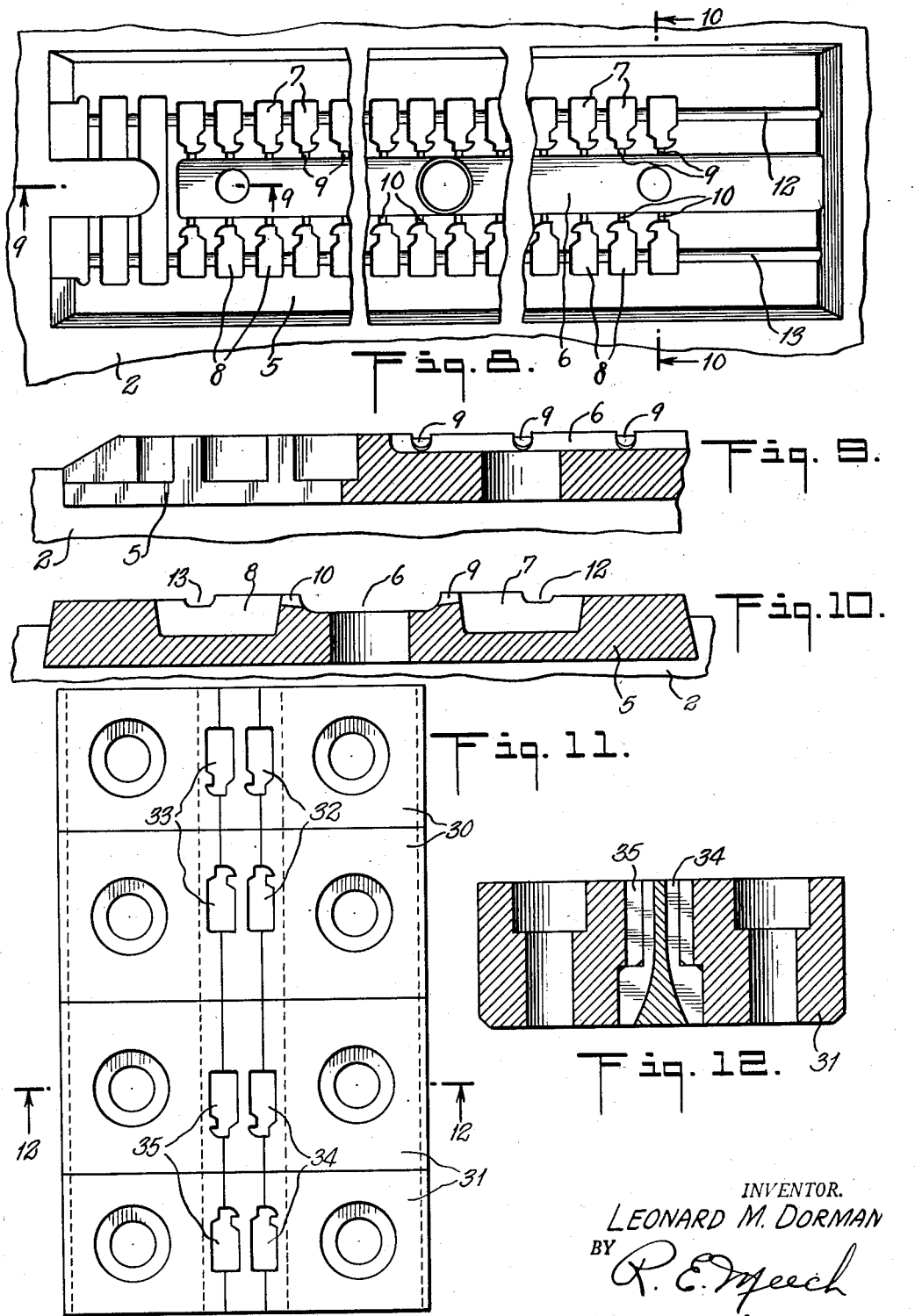

United States Patent Office 2,807,970
Patented Oct. 1, 1957

2,807,970

DIE INSERT FOR MOLDING SLIDE FASTENER STRINGERS AND METHOD OF MAKING THE SAME

Leonard M. Dorman, Meadville, Pa., assignor to Talon, Inc., a corporation of Pennsylvania Application September 8, 1951, Serial No. 245,667

6 Claims. (Cl. 76—107)

This invention relates to molds, particularly for molding slide fastener stringers, and more particularly to die inserts for such molds and the method of making the same.

A slide fastener consists generally of a pair of stringer tapes having a series of interlocking fastener elements attached to the opposed beaded edges thereof, and having a slider arranged thereon for longitudinal movement therealong for opening and closing the fastener.

Heretofore, it has been proposed to manufacture the fastener elements of such slide fasteners from a plastic material, such as nylon or other suitable thermoplastic material, preferably by injection molding in a two-part pressure mold in which the fastener elements are molded directly to the edges of a fabric tape. In such a mold, each half or part has a longitudinal channel or groove into which the plastic material is injected which communicates with two rows of spaced-apart cavities in the mold parts by means of small ports or gates. By means of such a mold, upon injection of the plastic material thereinto, there is formed a continuous ladder-like arrangement consisting of two rows of fastener elements secured to a longitudinally extending middle strip, corresponding to the longitudinal channel in the mold parts, by means of small connections, corresponding to the ports or gates extending from the side edge of the strip to the molded fastener element, disposed to either side thereof. After the molding operation is completed, the middle strip is removed together with the small connecting portions so as to provide a pair of fastener stringers.

It is necessary that the mold cavities in the mold for forming the fastener elements be uniformly formed and spaced in order to obtain a satisfactory fastener stringer. The mold cavities are usually hobbed or otherwise formed in the die parts, and heretofore it has been difficult and practically impossible to obtain a uniform spacing of these cavities in such mold parts. It is to a die insert for such molds and to a method of hobbing the same for obtaining a much improved result that the present invention relates.

Accordingly, it is the general object of the invention to provide an improved die insert for molds for molding slide fastener stringers wherein the mold cavities are uniformly formed and spaced whereby a uniform product is obtained.

It is another object of this invention to provide an improved method of hobbing die parts wherein the mold cavities formed therein are uniform and equally spaced apart from one another so as to provide a perfect mold part.

It is a further object of the present invention to provide an improved method of hobbing mold parts which is simple and inexpensive in its practice and, at the same time, by which efficient and effective results are obtained.

Various other objects and advantages of this invention will be more apparent in the course of the following specification, and will be particularly pointed out in the appended claims.

In the accompanying drawings, there is shown for the purpose of illustration, several embodiments which my invention may assume in practice.

In these drawings:

Fig. 1 is a side elevational view, partly in section, of the apparatus for forming or hobbing the recesses or cavities in the die insert;

Fig. 2 is a plan view of a pair of stringers molded by means of the die inserts of the present invention;

Fig. 3 is a fragmentary perspective view of the die insert;

Fig. 4 is a sectional view taken on line 4—4 of Fig. 1;

Fig. 5 is a sectional view taken on line 5—5 of Fig. 1;

Fig. 6 is a side elevational view, partly in section, of the die insert showing the die blank after it has been hobbed;

Fig. 7 is a similar view, partly in section, showing the completed die blank;

Fig. 8 is a plan view of the completed die insert;

Fig. 9 is a sectional view taken on line 9—9 of Fig. 8;

Fig. 10 is a sectional view taken on line 10—10 of Fig. 8;

Fig. 11 is a plan view showing a modified die blank or plate for hobbing the impressions in both the upper and lower die inserts at the same time; and Fig. 12 is a sectional view taken on line 12—12 of Fig. 11.

Referring more particularly to the drawings, there is shown in Fig. 8, one part 2 of a two-part mold employed in making the two stringers 3 and 4 illustrated in Fig. 2. In the mold part, there is securely mounted a plate-like die insert 5 in which there is arranged a longitudinally extending channel or runner 6 into which the plastic material is injected and from whence it is distributed to fastener element forming recesses or cavities 7 and 8, arranged in two rows along each side of the insert, through small ports or gates 9 and 10. It will be understood that the other mold part (not shown) is identical in that it is provided with a similar die insert which has a complementary channel or runner with ports or gates connecting it to complementary recesses or cavities. There is also provided in each of the die inserts complementary side channels 12 and 13 to accommodate the stringer tapes.

The present invention relates to the die insert 5 and to a method of forming or hobbing the fastener element forming recesses or cavities 7 and 8 therein which will now be described. The hobbing fixture or apparatus, as shown in Figs. 1, 4, and 5, includes a supporting member or base 20 having a die block or plate 21 mounted therein. In this die block, there is arranged two pairs of impressions 22 and 23 which correspond substantially to the shape of the cavities or recesses 7 and 8 to be formed in the die insert. The pair of impressions 22 are positioned directly opposite a pair of master punches 24 mounted in a suitable pitman or head 26 having means (not shown) arranged therewith for driving or striking the same and with which punches the impressions 22 cooperate to form the cavities 7 and 8 in the die insert in a manner to be described. That is to say, the master punches 24 are negative to the cavities or recesses 7 and 8 to be formed. It will be understood that the impressions 22 and 23 of each row are spaced apart an amount equal to that of the spacing between the cavities 7 and 8 to be formed in the die insert. The impressions 23 are provided for positioning and piloting the die insert for the hobbing or forming operations in a manner to be presently described.

Now as to the hobbing operation, a blank die part or insert 27 is positioned on the die block 21 over the impressions 22 and 23 therein. Both of the master punches 24 are then struck so as to form simultaneously in the surface of the blank die part 27 a pair of cavities 7 and 8, i. e., one in each row, of the desired depth, as shown in Fig. 5 of the drawings. As these cavities 7 and 8 are formed, the metal of the die blank 27 is displaced and forced downwardly into the impressions 22 in the die block 21, as more clearly shown in Figs. 1 and 5, so as to provide projecting portions 28 and 29 on the lower side of the die blank 27. After a pair of cavities 7 and 8 are thus formed in the die plate or blank 27, it is moved forwardly until the projecting portions 28 and 29 thus formed on the lower side of the plate register with the other pair of impressions 23 in the die block 21. This positions the die plate or blank 27 in position for the next punching operation for the next succeeding pair of cavities 7 and 8 to be formed in the blank. The punches 24 are then struck so as to form another pair of cavities 7 and 8 in the plate and projecting portions 28 and 29 on the lower side thereof. The above operations are repeated until the desired number of mold cavities are formed in the die plate. Thus, it will be seen that the projections 28 and 29 act to pilot the plate 27 and to position it properly so that the mold cavities 7 and 8 are spaced an equal distance apart from one end of the row to the other.

After the desired number of cavities 7 and 8 have been formed in the die plate or blank 27, there results a die plate, as shown in Fig. 6, having a pair of rows of cavities 7 and 8 arranged in one or the upper surface, and a pair of rows of projecting portions 28 and 29 arranged on the opposite or lower surface. These projecting portions 28 and 29 are then preferably removed by grinding or any other suitable means so as to provide a die blank as shown in Fig. 7. Small ports or gates 9 and 10, a runner 6, and tape channels 12 and 13 are then formed in the upper surface of the die blank 27 opposite and communicating with mold cavities 7 and 8 therein so as to provide a completed die insert as shown in Fig. 8.

In Figs. 11 and 12 of the drawings, there is shown a slight modification of the method of the present invention. By this modified method, both the upper and lower die inserts are hobbed at the same time. That is, there is provided two sets of die blocks 30 and 31 with each set having two pairs of impressions 32, 33, and 34, 35 formed therein similar to the impressions 22 and 23 in the block 21 of the preferred method. There is provided punches (not shown) similar to the punches 24 which cooperate with these impressions 32 and 34 in the same manner as described above to form in a pair of die plates (not shown) complementary cavities 7 and 8. The impressions 33 and 35 are provided for piloting and positioning the die plates in the same manner as the impressions 23 pilot the plate 27 in the preferred method. This latter method possibly insures a more accurate spacing of the cavities in that both die inserts, upper and lower, are hobbed simultaneously. The die inserts are hobbed as before with the projecting portions on the lower side removed after the hobbing operation and ports, runners, and tape channels formed therein to complete the inserts.

After the die inserts have been formed as above described, it will be understood that they are assembled in the upper and lower parts of the mold with the two mold parts positioned in a suitable injection molding machine. A pair of suitable stringer tapes T are positioned in the channels 12 and 13 between the mold parts. The mold parts are then brought together under pressure in a well-known manner and the molding material is forced into the runners 6, through the ports or gates 9 and 10 into the cavities 7 and 8 of the die inserts and around the beaded edges of the tapes which extend into the mold cavities so as to form the double fastener stringer as shown in Fig. 2. The double fastener stringer, as shown in Fig. 2, is then removed from the mold after it is opened and the runner and sprue connections are broken therefrom so as to provide a pair of fastener stringers having a series of equally spaced-apart fastener elements E arranged along one edge of each of the tapes T.

As a result of my invention, it will be seen that there is provided an improved die insert for molds particularly for molding slide fasteners, and an improved method of making or hobbing the mold inserts wherein the mold cavities are spaced an equal distance apart so as to insure a uniform and quality product as a result of the use of such die inserts. With the use of the die insert of the present invention, the fastener elements will be uniformly spaced apart in the completed fastener stringer which is extremely important in order to eliminate any danger of failure of the fastener when in use.

While I have shown and described several embodiments which my invention may assume in practice, it will be understood that these embodiments are merely for the purpose of illustration and description, and that other forms may be devised within the scope of my invention as defined in the appended claims.

What I claim as my invention is:

1. In the manufacture of die parts for an injection mold for molding slide fastener stringers wherein each die part has a series of cavities uniformly formed and spaced therealong with each cavity corresponding to substantially one-half of a fastener element, the method which comprises providing a master punch negative to the cavities to be formed, providing a die block having a pair of impressions therein corresponding to the cavities to be formed in said die part and spaced apart a distance equal to the desired spacing of cavities to be formed, positioning the die part on said die blank over said impressions therein, striking the master punch so as to form in the surface of the blank die part a cavity of the desired depth with the material of said die part being displaced by the forming and projecting from the opposite surface of the die part into one of said impressions so as to provide a projection on the opposite surface of said die part, advancing the die part so that the projection immediately previously formed is positioned in the other impression whereby the die part has been advanced a distance equal to the desired spacing of said cavities, again striking the master punch to the desired depth in said die part continuing the operation until the desired number of cavities have been formed in said die part, removing the projections from the lower side of said die part so as to provide a smooth uninterrupted surface thereon, and finally providing a channel and gates in the surface of said die part opposite and connected to said cavities for the passage of the molding material thereinto.

2. In the manufacture of die parts for an injection mold for molding slide fastener stringers wherein the mold consists of two die parts separable in the plane of the slide fastener tape with each die part having a series of cavities uniformly formed and spaced along the opposed surfaces thereof and with each cavity corresponding substantially to one-half of a fastener element, the method which comprises providing a pair of master punches negative to the cavities to be formed, striking both of said master punches at the same time so as to form in the surface of each of a pair of blank die parts simultaneously a cavity of the desired depth with the material of said die parts being displaced by the forming and projecting from the opposite surface of the die parts, advancing both of the die parts an amount equal to the desired spacing between cavities and employing the projections formed by such displacement as pilot means for positioning the die parts for the next succeeding cavities to be formed, again striking the master punches simultaneously to the desired depth, continuing the operation until the desired number of cavities have been formed in the die parts, and finally forming a channel and gates in the surface of each of said die parts opposite and connected to the respective cavities for the passage of the molding material thereinto.

3. In the manufacture of the die parts for molding slide fasteners, the method as defined in claim 2, including the step of removing the projections from the lower side of the die part after the desired number of cavities have been formed therein so as to provide a smooth uninterrupted surface on said die part.

4. In the manufacture of die parts for an injection mold for molding slide fastener stringers wherein each die part has two rows of mold cavities uniformly formed and spaced therealong with each cavity corresponding substantially to one-half of a fastener element, the method which comprises providing a pair of master punches negative to the cavities to be formed, striking both of said master punches at the same time so as to form in the surface of a blank die part simultaneously a pair of cavities of the desired depth with the material of the die part being displaced by the forming and projecting from the opposite surface of the die art, advancing the die part an amount equal to the desired spacing between cavities and employing the projections formed by such displacement as pilot means for positioning the die part for the next succeeding pair of cavities to be formed, again striking the master punches simultaneously to the desired depth, continuing the operation until the desired number of cavities have been formed in the die part, and finally forming a channel centrally of the two rows of cavities in the die part and a gate connecting each of the cavities with said channel for the passage of the molding material thereinto.

5. In the manufacture of die parts for an injection mold for molding slide fastener stringers wherein each die part has two rows of mold cavities uniformly formed and spaced therealong with each cavity corresponding substantially to one-half of a fastener element, the method which comprises providing a pair of master punches negative to the cavities to be formed, providing a die block having two pairs of impressions therein corresponding to the cavities to be formed in said die parts with the impressions of each pair spaced apart a distance equal to the desired spacing of the cavities to be formed, positioning a blank die part on said die block over said cavities therein, striking both of said master punches at the same time so as to form in the surface of the die part simultaneously a pair of cavities of the desired depth with the material of the die part being displaced by the forming and projecting from the opposite surface of the same into one of each pair of impressions so as to provide a pair of projections on the surface of said die part, advancing the die part so that the projections immediately previously formed are positioned in the other impression of each of the pairs of impressions in said die block whereby the die part has been advanced a distance equal to the desired spacing of said cavities, again striking both of said master punches to the desired depth in said die part, continuing the operation until the desired number of cavities have been formed in the die part, removing the projections from the lower side of said die part so as to provide a smooth uninterrupted surface thereon, and finally forming a longitudinally extending channel centrally between the two rows of cavities in the die part and gates connecting each of said cavities to said channel for the passage of the molding material thereinto.

6. In the manufacture of die parts for an injection mold for molding slide fastener stringers wherein the mold consists of two die parts separable in the plane of the slide fastener tape with each die part having a pair of rows of cavities uniformly formed and spaced along the opposed surfaces thereof and with each cavity corresponding substantially to one-half of a fastener element, the method which comprises providing two pairs of master punches negative to the cavities to be formed, striking all of said master punches at the same time so as to form in the surface of each of a pair of blank die parts simultaneously a pair of cavities of the desired depth with the material of the die parts being displaced by the forming and projecting from the opposite surface of the die parts, advancing both of the die parts an amount equal to the desired spacing between cavities and employing the projections formed by such displacement as pilot means for positioning the die parts for the next succeeding cavities to be formed, again striking the master punches simultaneously to the desired depth, continuing the operation until the desired number of cavities have been formed in the die parts, removing the projections from the lower side of said die part so as to provide a smooth uninterrupted surface thereon and finally forming a channel centrally between each pair of rows of cavities and gates connecting the channels so formed to the respective cavities for the passage of the molding material thereinto.

References Cited in the file of this patent

UNITED STATES PATENTS

| Number | Name | Date |
|---|---|---|
| 174,386 | Smart | Mar. 7, 1876 |
| 490,773 | Osborne | Jan. 31, 1893 |
| 1,499,309 | Ramsey | June 24, 1924 |
| 2,051,639 | Kalmbacker | Aug. 18, 1936 |
| 2,323,949 | Vosburg | July 13, 1943 |
| 2,378,562 | Lahr | June 19, 1945 |
| 2,415,291 | Kreyer | Feb. 4, 1947 |
| 2,440,963 | Luce | May 4, 1948 |
| 2,508,758 | Hollerith | May 23, 1950 |
| 2,510,999 | Oldofredi | June 13, 1950 |
| 2,622,456 | Cyuris | Dec. 23, 1952 |

FOREIGN PATENTS

| Number | Country | Date |
|---|---|---|
| 16 | Great Britain | Jan. 1, 1874 |
| 147,154 | Great Britain | May 12, 1921 |
| 527,373 | Great Britain | Oct. 8, 1940 |